US008320144B2

(12) United States Patent
Lee

(10) Patent No.: US 8,320,144 B2
(45) Date of Patent: Nov. 27, 2012

(54) POWER FACTOR CORRECTION CIRCUIT FOR REDUCING DISTORTION OF INPUT CURRENT

(75) Inventor: Jae Hoon Lee, Seoul (KR)

(73) Assignee: Silicon Mitus, Inc. (KR)

( * ) Notice: Subject to any disclaimer, the term of this patent is extended or adjusted under 35 U.S.C. 154(b) by 343 days.

(21) Appl. No.: 12/674,618

(22) PCT Filed: Aug. 22, 2008

(86) PCT No.: PCT/KR2008/004901

§ 371 (c)(1),
(2), (4) Date: Feb. 22, 2010

(87) PCT Pub. No.: WO2009/025517

PCT Pub. Date: Feb. 26, 2009

(65) Prior Publication Data

US 2011/0110127 A1 May 12, 2011

(30) Foreign Application Priority Data

Aug. 22, 2007 (KR) ........................ 10-2007-0084353

(51) Int. Cl.
*H02M 7/757* (2006.01)
*H02M 7/758* (2006.01)

(52) U.S. Cl. ........................... 363/89; 323/207; 323/222

(58) Field of Classification Search .......... 323/224–226, 323/242, 243, 246, 256, 266, 268–271, 282, 323/284, 285, 288, 290, 205, 222, 207; 363/18–21.12, 21.17, 21.18, 44–46, 49, 363/73–75, 78–82, 84, 86, 89, 90, 101, 123, 363/125, 126, 127

See application file for complete search history.

(56) References Cited

U.S. PATENT DOCUMENTS 5,003,454 A * 3/1991 Bruning .......................... 363/81

(Continued)

FOREIGN PATENT DOCUMENTS

JP 08-154381 6/1996

(Continued)

OTHER PUBLICATIONS

Claudio Adragna, "THD-Optimizer Circuits for PFC Pre-Regulators", AN1616 Appliation Note, Nov. 2002, pp. 1-16, STMicroelectronics.

(Continued)

*Primary Examiner* — Gary L Laxton
*Assistant Examiner* — Nusrat Quddus
(74) *Attorney, Agent, or Firm* — Cantor Colburn LLP

(57) ABSTRACT

The present invention relates to a power factor correction circuit that can reduce distortion of input current in a switching mode power supply. The power factor correction circuit provided in the present invention basically comprises a first inductor which is electrically connected at a first end thereof to an input terminal, a second coil that is coupled to the first inductor to form an induced voltage, a switch electrically connected to the a second terminal of the first inductor, and a switching control unit for controlling turn-on and turn-off of the switch. In such a power factor correction circuit of the present invention, the switching control unit is configured to differently set a turn-on period of the switch depending on the input voltage by generating a signal for controlling the turn-off of the switch using a second coil voltage induced at the secondary coil of the inductor by input voltage or a directly sensed input voltage. Accordingly, distortion of input current can be effectively corrected.

23 Claims, 11 Drawing Sheets

U.S. PATENT DOCUMENTS

| | | | | |
|---|---|---|---|---|
| 5,008,599 | A * | 4/1991 | Counts | 315/247 |
| 5,479,090 | A * | 12/1995 | Schultz | 323/284 |
| 6,128,205 | A | 10/2000 | Bernd et al. | |
| 6,944,034 | B1 * | 9/2005 | Shteynberg et al. | 363/21.13 |
| 6,956,750 | B1 * | 10/2005 | Eason et al. | 363/21.01 |
| 7,075,277 | B2 * | 7/2006 | Ishii et al. | 323/259 |
| 7,307,390 | B2 * | 12/2007 | Huynh et al. | 315/291 |
| 7,420,823 | B2 * | 9/2008 | Lanni | 363/16 |
| 7,433,211 | B1 * | 10/2008 | Collmeyer et al. | 363/21.13 |
| 2003/0223255 | A1 * | 12/2003 | Ben-Yaakov et al. | 363/89 |
| 2004/0263140 | A1 * | 12/2004 | Adragna et al. | 323/282 |
| 2005/0134244 | A1 * | 6/2005 | Sanzo et al. | 323/283 |
| 2006/0043953 | A1 * | 3/2006 | Xu | 323/282 |
| 2006/0049815 | A1 * | 3/2006 | Ho et al. | 323/282 |
| 2007/0013355 | A1 * | 1/2007 | Liao | 323/288 |
| 2008/0074975 | A1 * | 3/2008 | Hwang et al. | 369/53.15 |
| 2009/0230929 | A1 * | 9/2009 | Sui et al. | 323/207 |
| 2010/0046261 | A1 * | 2/2010 | Wu | 363/126 |
| 2011/0316518 | A1 * | 12/2011 | Feng et al. | 323/349 |

FOREIGN PATENT DOCUMENTS

| | | |
|---|---|---|
| JP | 2005-245127 | 9/2005 |
| KR | 10-2006-0026701 | 3/2006 |

OTHER PUBLICATIONS

International Search Report—PCT/KR2008/004901 dated Mar. 17, 2009.

* cited by examiner

Fig. 1 *Prior Art*
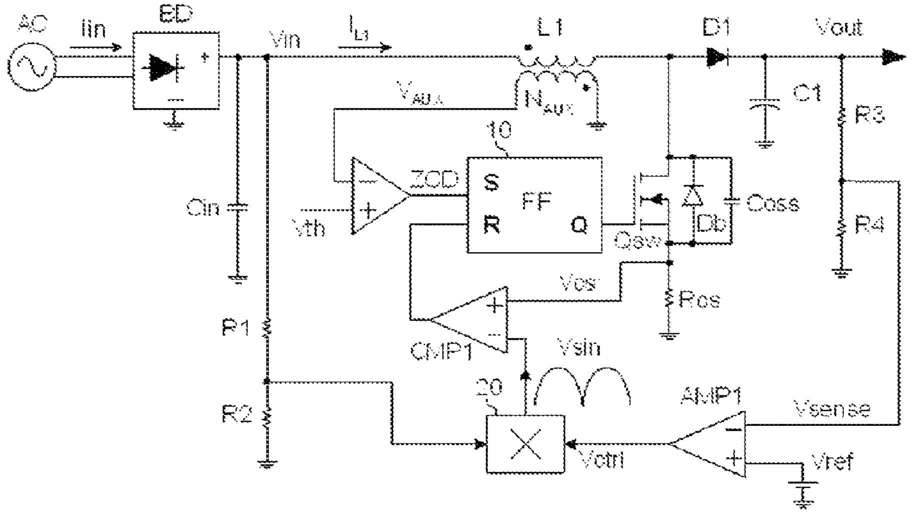
Fig. 2 *Prior Art*
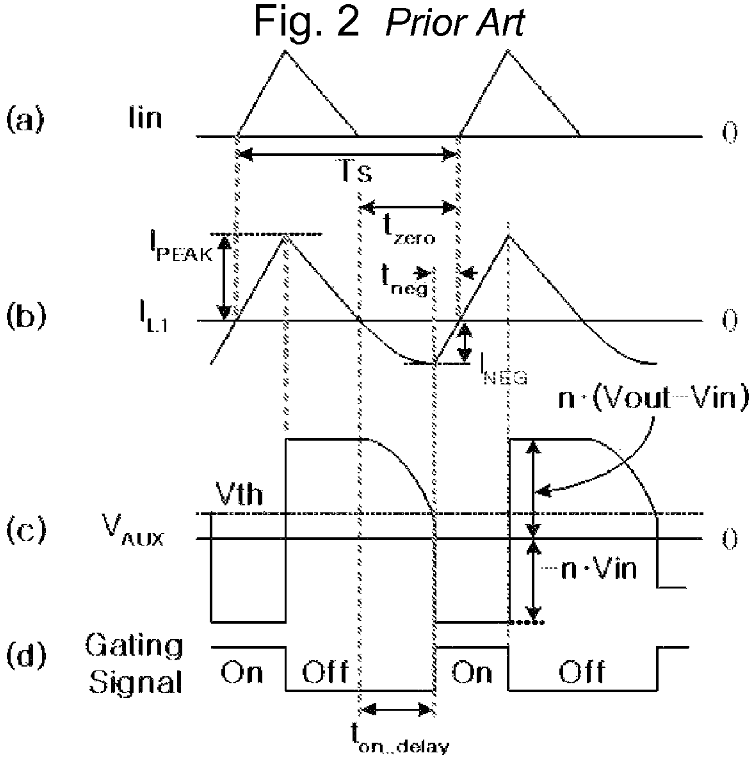

Fig. 3 *Prior Art*
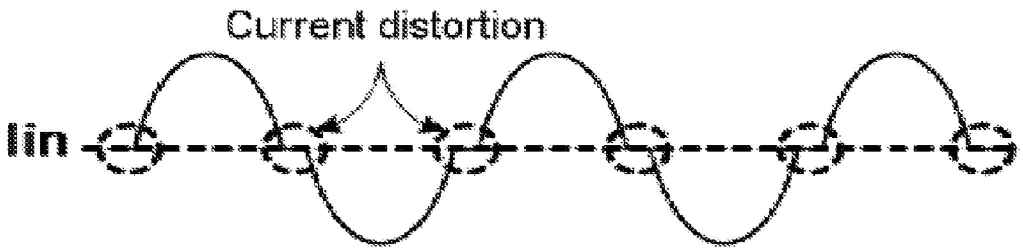
Fig. 4 *Prior Art*
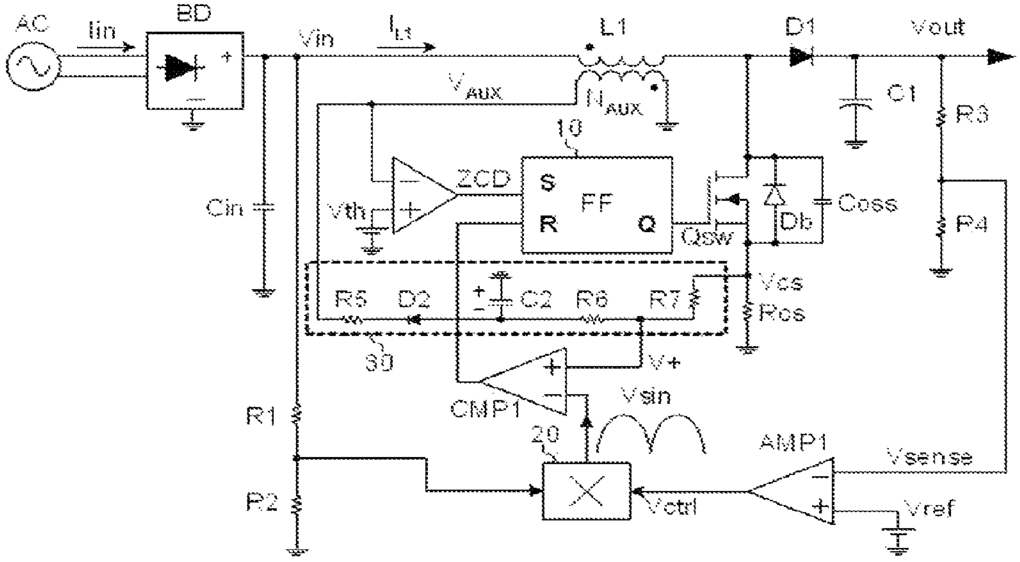

Fig. 5 *Prior Art*
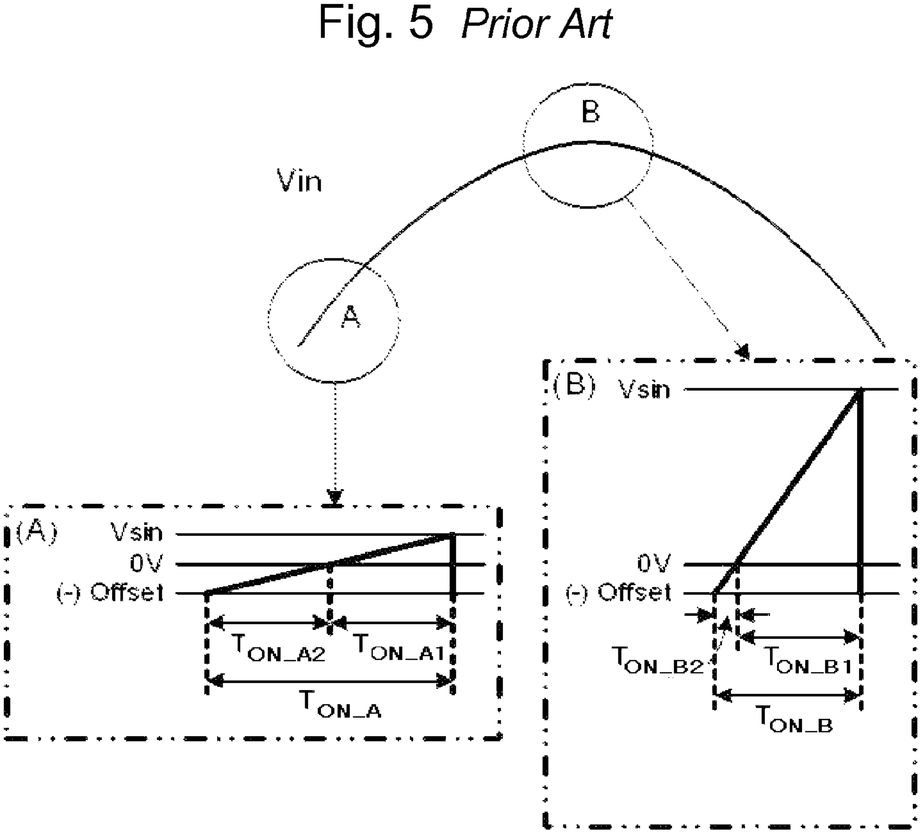
Fig. 6 *Prior Art*
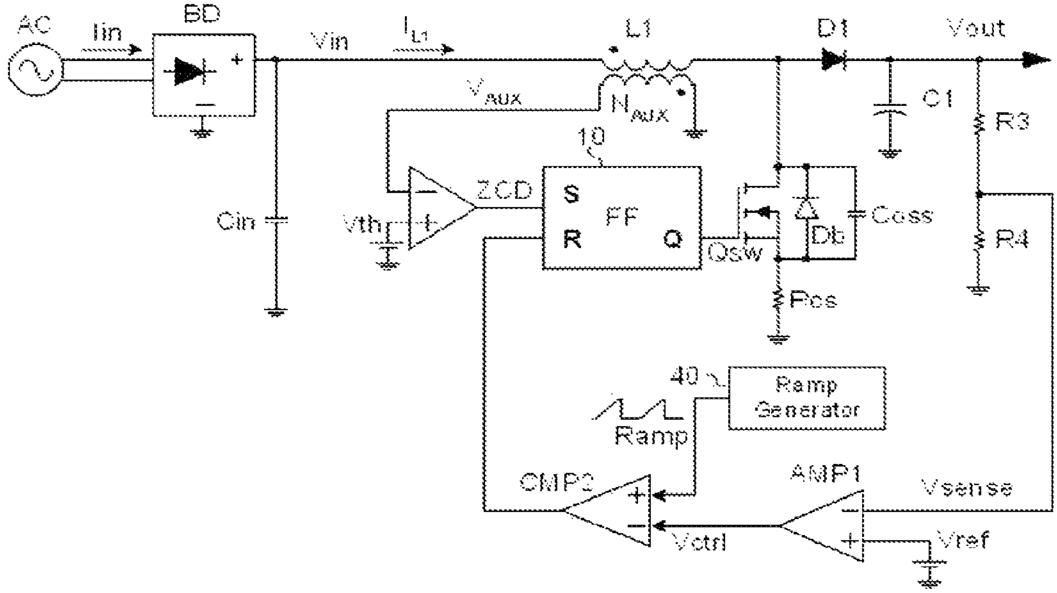

Fig. 7 *Prior Art*
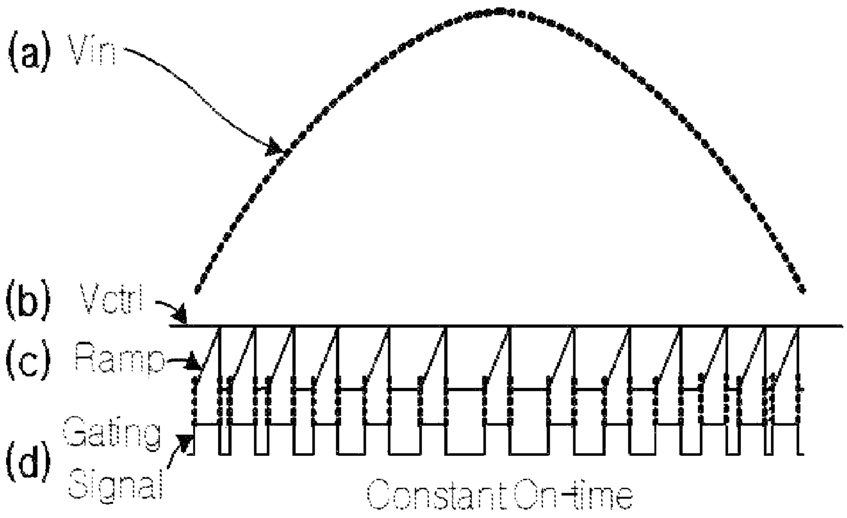
Fig. 8
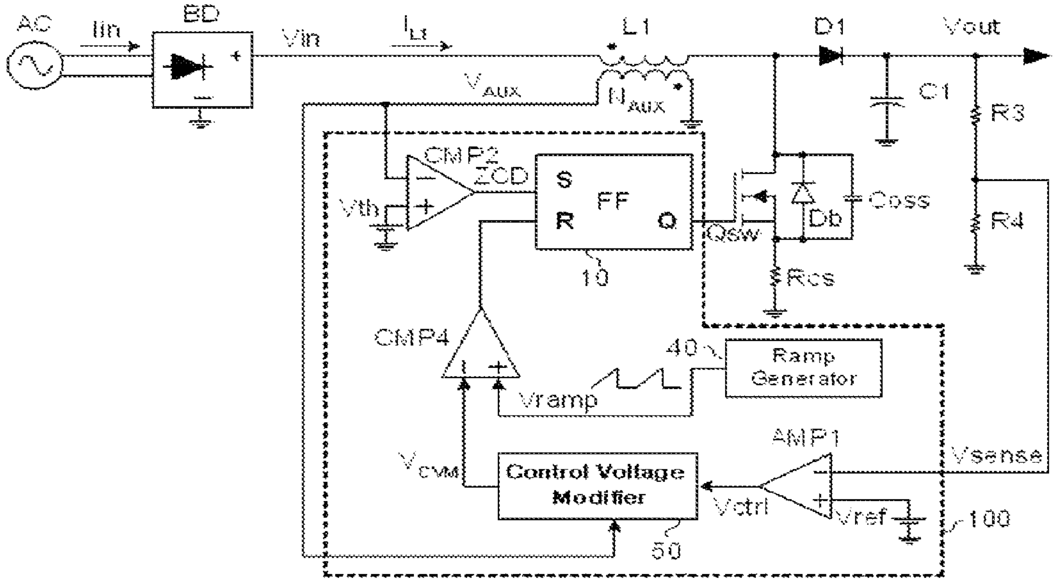

POWER FACTOR CORRECTION CIRCUIT FOR REDUCING DISTORTION OF INPUT CURRENT

TECHNICAL FIELD

The present invention relates to a power factor correction circuit for use in prevention of power loss invited by reactive power in a switching mode power supply, and more specifically, to a power factor correction circuit, that can correct a distortion of input current in a conventional power factor correction circuit.

BACKGROUND ART

Since a switching mode power supply (SMPS) that does not employ a power factor correction circuit generates a pulse-shaped input current, high-order harmonic current flows through transmission lines, and such current does not contribute to power transmission and increases a loss in the transmission lines, transformers and the like. For this reason, the capacity of transmission lines, substations, and power stations is relatively high as compared to a case where a power factor correction circuit is used.

Accordingly, there is a movement in many countries to regulate current harmonic recently, such as EN61000-3-2, and a power factor correction circuit is used in many SMPSs in order to satisfy the regulation. The SMPS is an apparatus for converting an inputted supply voltage into one or more direct current output voltages, which is used in most home appliances such as computers, monitors, TV sets, and the like. In such an SMPS, a power factor correction circuit is used which corrects power factor by having input current follow input voltage is used. That is, the power factor correction circuit is a circuit that allows input current applied to the outside to follow input voltage and simultaneously converts an inputted alternating current (AC) voltage into a constant direct current (DC) voltage.

Such a power factor correction circuit includes an inductor, and there exists several modes depending on the state of the current flowing through the inductor. A discontinuous conduction mode refers to a case where there exists a point where the current flowing through the inductor becomes zero and thus the current is discontinuous, and a continuous conduction mode refers to a case where the current flowing through the inductor is continuous without a point where the current flowing through the inductor becomes zero. On the other hand, a critical conduction mode refers to a mode operating at a boundary point between the continuous conduction mode and the discontinuous conduction mode, in which the current flowing through the inductor increases immediately after the current flowing through the inductor becomes zero. STL6561 is the most well-known power factor correction circuit IC of the critical conduction mode, and besides this, FAN7527B, TDA4862, TDA4863, MC33260, MC33262, UC3852, SG6561, and the like are also power factor correction circuit ICs of the critical conduction mode.

FIG. 1 is a schematic circuit diagram showing a general power factor correction circuit of a critical conduction mode, and FIG. 2 is a waveform chart showing input current Iin flowing into the power factor correction circuit, current $I_{L1}$ flowing through an inductor L1, voltage $V_{AUX}$ applied to the secondary coil $N_{AUX}$ of the inductor, and a gating signal inputted into a switch Qsw in the power factor correction circuit of FIG. 1. FIG. 3 is a view showing an input current waveform where a current distortion phenomenon occurs in a general power factor correction circuit shown in FIG. 1. Hereinafter, described is the operation of a general power factor correction circuit of a critical conduction mode and total harmonic distortion (THD) that occurs at this point, with reference to FIGS. 1 to 3.

Referring to FIG. 1, first, inputted alternating current voltage (AC) is full-wave rectified by a bridge diode BD, and the full-wave rectified voltage is sensed by resistors R1 and R2 and inputted into an adder 20. The sensed full-wave rectified voltage inputted into the adder 20 is multiplied by the output of an error amplifier AMP1 and inputted into the inverting terminal (−) of a comparator CMP1. On the other hand, the current flowing through the switch Qsw is sensed by a resistor Rcs, and the sensed voltage Vcs is inputted into the non-inverting terminal (+) of the comparator CMP1. The comparator CMP1 compares output of the adder 20 with output voltage of the error amplifier AMP1 and outputs a signal for turning off the switch Qsw to the reset terminal R of the flip-flop 10 at a point where the current flowing through the switch Qsw reaches a reference current outputted from the adder 20. Accordingly, the flip-flop FF turns off the switch Qsw by outputting a low signal to the output terminal Q. If the switch is turned off, the current of the inductor gradually decreases, and the time point when the current of the inductor becomes zero is sensed using the secondary coil $N_{AUX}$ of the inductor L1. If the time point when the current flowing through the inductor L1 becomes zero is sensed through the secondary coil $N_{AUX}$, the set terminal S of the flip-flop 10 turns to a high signal, and thus the high signal is outputted to the output terminal Q. Accordingly, the switch Qsw is turned on. In this manner, the switch Qsw is turned on at the point where the current flowing through the inductor L1 becomes zero, and the switch Qsw is turned off at the point where the current flowing through the inductor L1 reaches the reference current inputted into the inverting terminal (−) of the comparator CMP1. Therefore, the input current follows the input voltage, and the power factor correction circuit operates in the critical conduction mode.

If the method described above is used, ideally, the input current should be in a sine wave, which is the same as the shape of the input voltage, by the power factor correction circuit. However, since there exits a delay time taken to sense a point where the current flowing through the inductor L1 becomes zero (hereinafter, referred to as a ✱ero current sensing delay time?, the input current is not rendered to be in a perfect sinusoidal shape. Most of power factor correction circuits of a critical conduction mode sense a point where the current flowing through the inductor L1 becomes zero through the secondary coil $N_{AUX}$ of the inductor as shown in FIG. 1. However, in this case, there exists a delay time until the switch Qsw is turned on after the current $I_{L1}$ of the inductor L1 becomes zero, i.e. the zero current sensing delay time, as shown in FIG. 2. When the switch Qsw is turned on, the current $I_{L1}$ increases at a linear slope, and at this point, the voltage $V_{AUX}$ applied to the secondary coil $N_{AUX}$ of the inductor becomes −n*Vin (here, n denotes a turn ratio of a transformer). On the other hand, when the switch Qsw is turned off, the current $I_{L1}$ decreases at a negative slope, and the voltage $V_{AUX}$ becomes n*(Vout−Vin). At this point, although the switch Qsw should be turned on at the point where the current $I_{L1}$ becomes zero, since resonance is formed between the junction capacitor Coss of the MOSFET used as the switch Qsw and the inductor L1, the current $I_{L1}$ decreases to a negative value. It is since that voltage of the capacitor Coss becomes Vout when the switch Qsw is turned off and Vout is generally set to be higher than Vin. Therefore, since electric charge charged in the capacitor Coss is discharged through the inductor L1 if the current of the inductor becomes zero and the output diode D1 is turned off, the current $I_{L1}$ of the inductor decreases to a negative value. Here, the capacitor Coss connected to the switch Qsw in parallel is a junction capacitor of a MOSFET, and the diode Db is a body diode. At the point where the capacitor Coss is discharged by resonance current and thus the voltage $V_{AUX}$ is decreased to be lower than the reference voltage Vth, a high signal is inputted into the set terminal S of the flip-flop 10, and the switch Qsw is turned on.

Due to the operation of the zero current sensing circuit, the current of the inductor does not increase immediately after becoming zero, but increases after flowing as a negative current. Therefore, as shown in FIG. 2(*a*), there exists a zero current section $t_{zero}$ in the input current Iin of the power factor correction circuit, and thus, the average value of the input current is decreased. On the other hand, the peak value $I_{NEG}$ of the negative current establishes the relation shown in Equation 1.

$$I_{NEG} \propto \frac{Vout - Vin}{\sqrt{\frac{L1}{C_{oss}}}} \quad \text{[Equation 1]}$$

In Equation 1, Vout denotes an output voltage, and Vin denotes a full-wave rectified input voltage. As is known from Equation 1, the peak value $I_{NEG}$ of negative current is proportional to the difference between the output voltage Vout and the input voltage Vin. Since the inductor L1 and the capacitor Coss have a fixed value and the output voltage Vout is a fixed value, the negative output current $I_{NEG}$ is inverse proportional to the input voltage Vin. Accordingly, as the input voltage Vin is lowered, the current $I_{L1}$ is further lowered to a negative value. That is, the peak value $I_{NEG}$ of negative current is further increased at the point where the input voltage Vin passes zero voltage, and the time taken to reach the zero current from the negative current is increased when the switch is turned on again. Accordingly, zero crossing distortion occurs in the input current around the zero current as shown in FIG. 3. On the other hand, the input current shown in FIG. 3 is current before rectification.

U.S. Pat. No. 6,128,205 is a prior art for improving such distortion. U.S. Pat. No. 6,128,205 discloses a method of modifying information on rectified input voltage, which acts as a reference for turning off a switch, in order to further increase the current $I_{L1}$ flowing through the inductor L1 at the point where the input voltage becomes zero. That is, the voltage applied to resistor R2 is clamped through an additional circuit and inputted into the adder 20 as shown in FIG. 1. With the rectified input voltage that is modified as described, the distortion occurring around the point where the input current becomes zero is corrected. However, such a prior art needs an additional circuit (including a plurality of resistors or the like) in order to modify the rectified input voltage and thus has a problem in that a large amount of cost is required and power is consumed by the plurality of resistors.

A method described in application note AN161 of STMicroelectronics is another conventional method, which is a method of adjusting turn-on time of a switch based on an input voltage using the second coil voltage $V_{AUX}$ when the switch is turned on. In this method, since the second coil voltage $V_{AUX}$ is proportional to the input voltage when the switch is turned on, after storing information on the input voltage in C2, a negative offset voltage ((−) Offset), which is proportional to the peak voltage of the input voltage Vin, is added to the switch current detection voltage Vcs and connected to the non-inverting terminal of the comparator CMP1. Since the voltage is increased from zero if the negative offset voltage is not added, turn-on time of the switch becomes $T_{ON\_A1}$ in region A and $T_{ON\_B1}$ in region B as shown in FIG. 5. However, if the negative offset voltage is added, although the switch current detection voltage Vcs is increased from the same negative voltage, the slope of the switch current detection voltage Vcs is proportional to the input voltage Vin, and thus the turn-on time increased by the negative offset voltage becomes $T_{ON\_A2}$ in region A and $T_{ON\_B2}$ in region B. Therefore, the time increased in region A is further larger than the time increased in region B, and thus the current distortion phenomenon is corrected by increasing the input current in region A with the turn-on time increased as such. However, this method also has a problem in that a plurality of elements is needed and thus cost is increased.

The prior arts described above are related to a circuit using a current mode control method (current mode PWM) that determines a turn-off time point of a switch by detecting current of the switch, among presently used power factor correction circuits.

Recently, frequently used is a power factor correction circuit using a voltage mode control method (voltage mode PWM) that determines a turn-off time point of a switch without detecting current of the switch as shown in FIG. 6. Since the voltage mode control method does not need information on input voltage unlike the current mode control method, an input voltage detection circuit (R1 and R2 in FIGS. 1 and 4) is not needed, and thus it is advantageous in that loss of power can be reduced.

The circuit operates in a method of generating a linearly increasing ramp signal by a ramp generator after a switch is turned on, comparing the ramp signal with the control voltage Vctrl of the output voltage controller AMP1, and turning off the switch if the ramp signal becomes equal to the control voltage Vctrl of the output voltage controller AMP1. The zero current sensing circuit and its operating method are the same as those of the power factor correction circuit of the current mode control method. If the power factor correction circuit operates as described, turn-on time of the switch does not change depending on the input voltage, but is constantly maintained as shown in FIG. 7, and power factor can be controlled.

However, the power factor correction circuit of the voltage mode control method also has the same problem of occurring distortion of input current as shown in FIG. 3 due to zero current sensing delay time.

DISCLOSURE

Technical Problem

Accordingly, the present invention has been made in order to solve the above problems, and it is an object of the invention to provide a power factor correction circuit, in which distortion of input current can be reduced in a circuit that employs a voltage mode control scheme among power factor correction circuits of a critical conduction mode, without an additional circuit such as a plurality of resistors.

Technical Solution

In order to accomplish the above object of the invention, according to one aspect of the invention, there is provided a power factor correction circuit provided with a boost circuit including a first inductor which is electrically connected at a first end thereof to an input terminal and is electrically connected at a second end thereof to a switch, the power factor correction circuit comprising: a second coil coupled with the first inductor for allowing a second coil voltage to be induced by the first inductor; and a switching control unit for receiving the second coil voltage and an output voltage of an output terminal of the power factor correction circuit and adjusting a turn-on period of the switch by generating a signal for turning on and off the switch.

At this point, the switching control unit turns on the switch using the second coil voltage when the current flowing through the first inductor becomes zero from positive and, in turning off the switch after the switch is turned on, receiving a first control voltage corresponding to the output voltage of the output terminal, generating a second control voltage by adjusting the waveform of the first control voltage using an input sensing voltage, i.e., the second coil voltage or the input voltage of the input terminal, comparing the second control voltage created as such with a certain reference voltage, and turning off the switch at a time point when the second control voltage becomes equal to the reference voltage.

In addition, in the present invention, other than the method of adjusting a turn-off time point by modifying the first control voltage as described above, the switching control unit can be configured to generate a turn-off reference voltage by adjusting a waveform of a certain reference voltage, such as a ramp waveform voltage, using the second coil voltage (or an input sensing voltage that is the detected input voltage of the input terminal), compare the turn-off reference voltage generated as such with a first control voltage corresponding to the output voltage of the output terminal of the power factor correction circuit, and turn off the switch at a time point when the first control voltage becomes equal to the turn-off reference voltage.

That is, in order to solve the problem of distortion of an input current waveform and degradation of power factor in a conventional power factor correction circuit, which occurs as the input voltage is increased, the present invention is configured to vary turn-on time of the switch by adjusting output voltage of an error amplifier of the power factor correction circuit depending on information on the input voltage.

Advantageous Effects

According to the present invention configured as described above, a second coil voltage induced at the secondary coil by input voltage is used, or the input voltage is directly sensed, and then turn-on time of a switch is differently set depending on the input voltage in order to correct distortion of input current, and thus it is effective in that power factor of input current can be improved.

DESCRIPTION OF DRAWINGS

FIG. 1 is a schematic circuit diagram showing a circuit that employs a current mode control method among general power factor correction circuits of a critical conduction mode.

FIG. 2 is a waveform chart showing an input current, a current flowing through an inductor, a voltage applied to the secondary coil of the inductor, and a gating signal inputted into a switch in the power factor correction circuit of FIG. 1.

FIG. 3 is a waveform chart showing input current in the general power factor correction circuit shown in FIG. 1.

FIG. 4 is a circuit diagram showing a power factor correction circuit of the prior art for reducing an input current distortion phenomenon of the circuit shown in FIG. 1.

FIG. 5 is a diagrammatic view illustrating the operation of the circuit shown in FIG. 4 in detail.

FIG. 6 is a circuit diagram schematically showing a circuit that employs a voltage mode control method among general power factor correction circuits of a critical conduction mode.

FIG. 7 is a waveform chart showing an input voltage, an output voltage of an output voltage controller, an ramp voltage, and a gating signal inputted into a switch in the power factor correction circuit of FIG. 6.

FIG. 8 is a circuit diagram showing a power factor correction circuit according to a first embodiment of the present invention.

Figure 9:
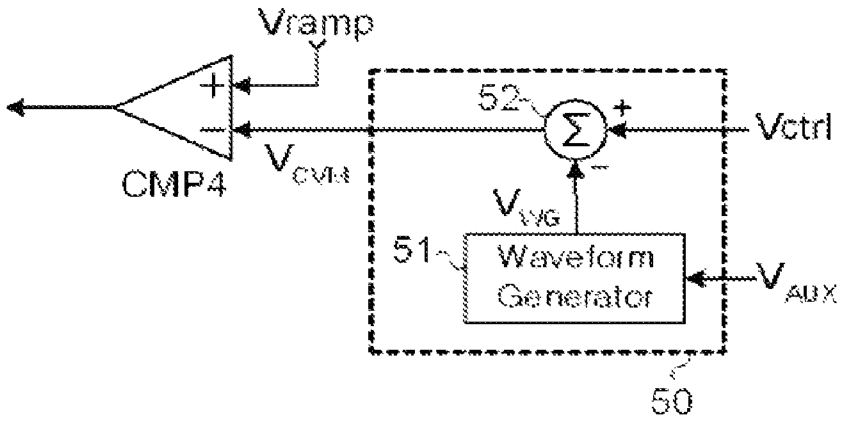
FIG. 9 is a view showing the control voltage modifier of FIG. 8 in detail.

| * Explanation on reference numerals of main elements of the drawings * | |
|---|---|
| 100, 200, 300, 400: | switching control unit |
| 10: | flip-flop |
| 40: | ramp generator |
| 50: | control voltage modifier |
| 51, 60: | waveform generator |
| 52, 210: | adder |

MODE FOR INVENTION

Hereinafter, the preferred embodiments of the present invention will be described in detail with reference to the accompanying drawings. Furthermore, in the drawings illustrating the embodiments of the invention, portions which are not related with the description have been omitted for the sake of clarity. Elements having the same or like functions will be denoted by the same or like reference numerals without using separate reference numerals.

FIG. 8 is a circuit diagram showing a power factor correction circuit according to a first embodiment of the present invention. As shown in FIG. 8, the power factor correction circuit according to the first embodiment of the present invention comprises a bridge diode BD, an inductor L1, a switch Qsw, a boost circuit configured with a diode D1 and a capacitor C1, and a switching control unit 100. Hereinafter, the inductor L1, the switch Qsw, the diode D1 and the capacitor C1 are inclusively referred to as a boost circuit for the convenience of explanation.

The bridge diode BD rectifies inputted alternating current AC voltage and outputs a full-wave rectified voltage Vin. The switching control unit 100 receives a sensed output voltage Vsense and a second coil voltage $V_{AUX}$ induced at a second coil $N_{AUX}$, which is the secondary coil of the inductor L1, and generates a control signal for controlling turn-on/turn-off of the switch Qsw. The switch Qsw is turned on and turned off by the control signal of the switching control unit 100, and a constant direct current voltage Vout is outputted to the capacitor C1 of the boost circuit. Here, the power factor correction circuit according to the first embodiment of the present invention differently sets the turn-on period of the switch Qsw depending on the input voltage Vin using the fact that the secondary coil voltage becomes n*Vin when the switch Qsw is turned on as shown in FIG. 2(*c*), thereby correcting distortion of input current, and the detailed method thereof will be described below. Since the full-wave rectified voltage Vin is a full-wave rectified value of the inputted alternating current (AC) voltage, the alternating current (AC) voltage has the same magnitude as that of the full-wave rectified voltage Vin, and thus, hereinafter, the terminology 뭝nput voltage? is used as a meaning of a full-wave rectified voltage Vin.

In addition, the power factor correction circuit according to the embodiment of the present invention may further comprise resistors R3 and R4 for sensing an output voltage Vout in order to feed back the output voltage Vout. The resistors R3 and R4 are connected to each other in a series between one end of the capacitor C1 and the ground, and a sensed output voltage Vsense applied to the resistor R4 is inputted into the switching control unit 100. On the other hand, in the present invention, although the output voltage inputted into the switching control unit 100 may be the output voltage Vout itself of the output terminal of the power factor correction circuit, it may be a voltage distributed by the resistors R3 and R4 and corresponding to the output voltage of the output terminal, and in the present invention, an output voltage is used as a meaning that includes the two cases described above.

In the boost circuit, one end of the inductor L1 is connected to the output of the bridge diode BD, and the other end is connected to the anode of the diode D1. The cathode of the diode D1 is connected to one end of the capacitor C1, and the other end of the capacitor C1 is connected to the ground. The drain terminal of the switch Qsw is connected to the contact point of the inductor L1 and the diode D1, the source terminal is connected to the ground, and the gate terminal is connected to the output terminal of the switching control unit 100. Then, the second coil $N_{AUX}$ forms a transformer together with the inductor L1 and allows voltage induced by the inductor L1 to be inputted into the switching control unit 100. Through the connection of such a transformer provided with the secondary coil, the second coil $N_{AUX}$ is used to sense a point where the current $I_{L1}$ flowing through the inductor L1 becomes zero, and the second coil voltage $V_{AUX}$ is inputted into the switching control unit 100.

Here, in the first embodiment of the present invention, using the fact that the voltage applied to the inductor L1 becomes Vin when the switch Qsw is turned on, and accordingly, the second coil voltage $V_{AUX}$ induced at the secondary coil $N_{AUX}$ becomes −n*Vin (here, n denotes a turn ratio of a transformer), the second coil voltage $V_{AUX}$ is used to turn on the switch Qsw and to adjust the turn-on period of the switch Qsw as well. On the other hand, a comparator CMP2 is connected between the second coil voltage $V_{AUX}$ and the set terminal S of the flip-flop FF and generates a signal for turning on the switch when the second coil voltage $V_{AUX}$ is lower than a reference voltage Vth. On the other hand, a sensing resistor Rsense for sensing the current flowing through the switch Qsw is connected between the source terminal of the switch Qsw and the ground. On the other hand, although the switch Qsw is shown as a MOSFET in FIG. 8, the present invention is not limited to this, but another switching element such as a bipolar transistor or the like can be used. In addition, the capacitor Coss and the diode Db connected to the drain and source terminals of the switch Qsw in parallel respectively represent the junction capacitance and the body diode of the MOSFET.

The switching control unit 100 of the power factor correction circuit according to the first embodiment of the present invention comprises a flip-flop 10, an output voltage controller AMP1, a control voltage modifier 50, a first comparator CMP2, a second comparator CMP4, and a ramp generator 40.

A reference voltage Vref is inputted into the non-inverting terminal (+) of the output voltage controller AMP1, and a sensed output voltage Vsense is inputted into the inverting terminal (−). The output voltage controller AMP1 compares the two voltages and outputs a first control voltage Vctrl in order to control the output voltage of the power factor correction circuit to a desired voltage. The second coil voltage $V_{AUX}$ and the first control voltage Vctrl are inputted into the control voltage modifier 50, adjusted by the control voltage modifier, and outputted as a second control voltage $V_{CVM}$. Then, the second control voltage $V_{CVM}$ outputted from the control voltage modifier 50 is inputted into the inverting terminal (−) of the second comparator CMP4, and a ramp waveform voltage generated from the ramp generator 40 is inputted into the non-inverting terminal (+). The second comparator CMP4 compares the two inputs and outputs a high signal to the reset terminal R of the flip-flop 10 at a point where the ramp waveform voltage becomes the second control voltage $V_{CVM}$ of the control voltage modifier 50. If the high signal is inputted into the reset terminal R of the flip-flop 10, a low signal is outputted from the output terminal Q of the flip-flop 10, and the switch Qsw is turned off.

Here, a point where the current flowing through the inductor L1 becomes zero is sensed through the second coil $N_{AUX}$, i.e., the secondary coil of the inductor L1, as described above. That is, when the first comparator CMP2 senses a point where the current flowing through the inductor L1 becomes zero through the second coil $N_{AUX}$ as the second coil voltage $V_{AUX}$ drops below a certain first reference voltage $V_{th}$, the set terminal S of the flip-flop 10 turns to a high signal, and the high signal is outputted from the output terminal Q. Accordingly, the switch Qsw is turned on. In this manner, according to the power factor correction circuit of the present invention, the switch Qsw is turned on at the point where the current flowing through the inductor L1 becomes zero, and the second comparator CMP4 outputs a high signal at the point where the output voltage $V_{CVM}$ of the control voltage modifier 50 becomes a ramp waveform voltage Vramp, and the switch is turned off.

On the other hand, according to the major technical features of the first embodiment of the present invention, in the present embodiment, the control voltage modifier 50 generates a second control voltage Vcvm by modifying the first control voltage Vctrl of the output voltage controller AMP1 depending on the second coil voltage $V_{AUX}$ and adjusts the turn-on period by controlling the turn-off of the switch using the second control voltage Vcvm adjusted as such, in order to correct distortion of input current. Hereinafter, such an operation will be described in detail with reference to the accompanying FIGS. 9, 11, 12 and 14. That is, since the voltage $V_{AUX}$ induced at the second coil $N_{AUX}$ when the switch Qsw is turned on has information on the input voltage Vin, the control voltage modifier 50 receives the second coil voltage $V_{AUX}$ in order to obtain the information on the input voltage Vin and sets the first control voltage Vctrl of the output voltage controller AMP1 to have another voltage depending on the input voltage Vin using the second coil voltage $V_{AUX}$, which will be described hereinafter.

FIG. 9 is a view showing an example of the internal configuration of the control voltage modifier 50 according to the first embodiment of the present invention. As shown in FIG. 9, the control voltage modifier 50 according to the embodiment of the present invention comprises a waveform generator 51 for generating a waveform that changes in correspondence to the second coil voltage $V_{AUX}$ and an adder 52 for subtracting output voltage $V_{WG}$ of the waveform generator 51 from the first control voltage Vctrl of the output voltage controller AMP1. Output of the adder 52 is inputted into the inverting terminal of comparator CMP4 and is compared with a ramp voltage Vramp inputted into the non-inverting terminal in order to determine a turn-off time point of the switch.

Figure 11:
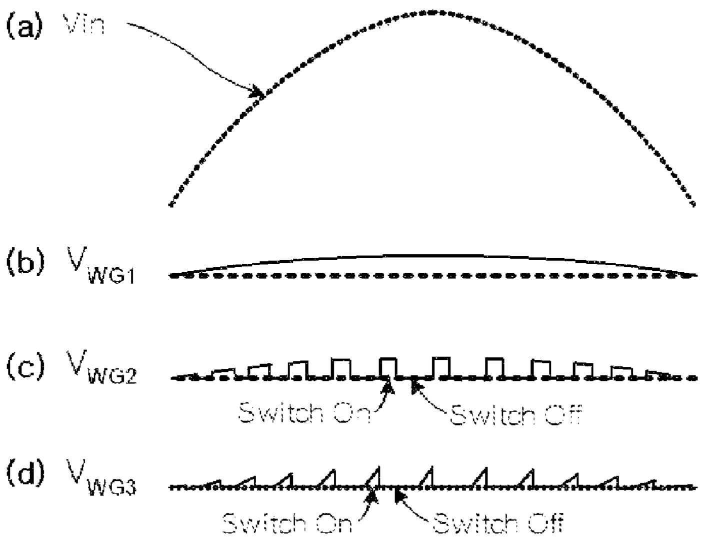
FIG. 11 is a waveform chart showing a variety of waveforms that can be generated from the waveform generator of FIG. 9.

FIG. 11 shows various waveforms of output voltage $V_{WG}$ of the waveform generator 51 depending on input voltage Vin. FIGS. 11(*a*), (*b*), (*c*), and (*d*) respectively show an input voltage Vin, a case where output voltage of the waveform generator 51 is proportional to the input voltage $V_{WG1}$, a case where output voltage of the waveform generator 51 is proportional to the input voltage during the switch turn-on period $V_{WG2}$, and a case where output voltage of the waveform generator 51 is a ramp waveform having a slope that is proportional to the input voltage during the switch turn-on period $V_{WG3}$.

Figure 12:
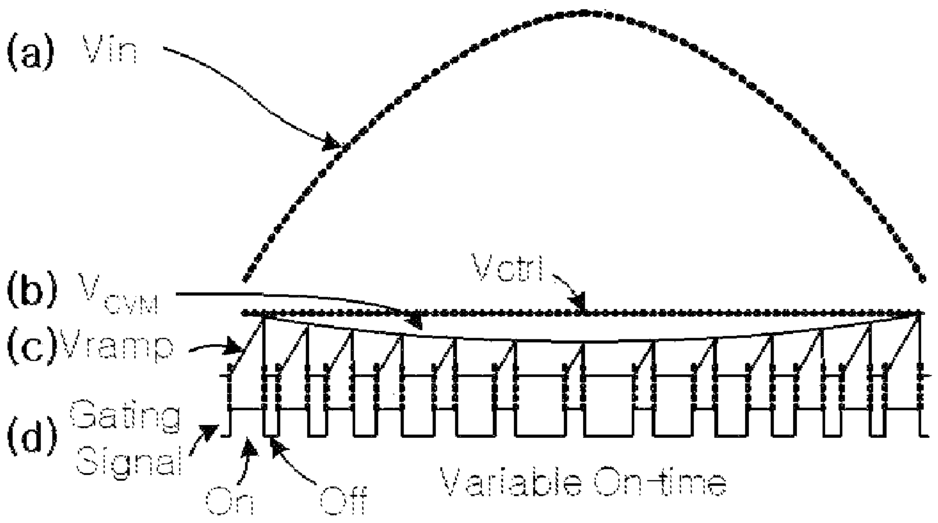
FIG. 12 is a waveform chart showing an input voltage, an output voltage of the control voltage modifier, a ramp voltage, and a gating signal inputted into a switch when output of the waveform generator is proportional to input voltage in FIG. 8.

FIGS. 12 to 15 are waveform charts respectively showing waveforms of the second control voltage $V_{CVM}$, generated from the control voltage modifier 50 and the ramp voltage Vramp, together with turn-on periods of the switch Qsw, in order to describe the process of performing turn-on and turn-off operations of the switch for each of outputs $V_{WG}$ of the waveform generator 51 shown in FIG. 11. First, FIG. 12 shows turn-on/turn-off operations of the switch in the case where the output voltage $V_{WG}$ of the waveform generator 51 is proportional to the input voltage as shown in FIG. 11, in which FIGS. 12(*a*), (*b*), (*c*), and (*d*) respectively show an input voltage Vin, a first control voltage Vctrl and a second control voltage $V_{CVM}$ of the control voltage modifier 50, an output voltage Vramp of the ramp generator 40, and a gating signal inputted into the switch.

In this case, as shown in FIG. 11(*b*), since output voltage $V_{WG}$ of the waveform generator 51 is proportional to the input voltage Vin, the second control voltage $V_{CVM}$ outputted from the control voltage modifier 50 becomes a waveform shown in FIG. 12(*b*), and since the comparator CMP4 compares the second control voltage $V_{CVM}$, with the output voltage Vramp of the ramp generator 40, switch turn-on time of the gating signal changes depending on the input voltage as shown in FIG. 12(*d*).

That is, since the second control voltage $V_{CVM}$ outputted from the control voltage modifier 50 is lowered and meets the ramp voltage Vramp earlier as the input voltage Vin is higher, turn-on time of the switch is decreased as shown in FIG. 12(*d*). In addition, since the second control voltage $V_{CVM}$ generated and outputted from the control voltage modifier 50 is increased and meets the ramp voltage Vramp later as the input voltage approaches zero, the turn-on time of the switch is extended as shown in FIG. 12(*d*). Therefore, it is understood that the turn-on period of the switch Qsw is changed depending on the magnitude of the input voltage Vin as shown in FIG. 12(*d*). That is, the turn-on period of the switch Qsw is long when the input voltage Vin is low, and the turn-on period of the switch Qsw is short when the input voltage Vin is high. Accordingly, when the input voltage Vin is low, the turn-on period of the switch Qsw is extended, and thus the current flowing through the inductor L1 is increased, and the input current Iin is increased. Therefore, distortion of input current occurring around zero input voltage (zero crossing distortion) can be reduced, and thus power factor is improved.

Figure 14:
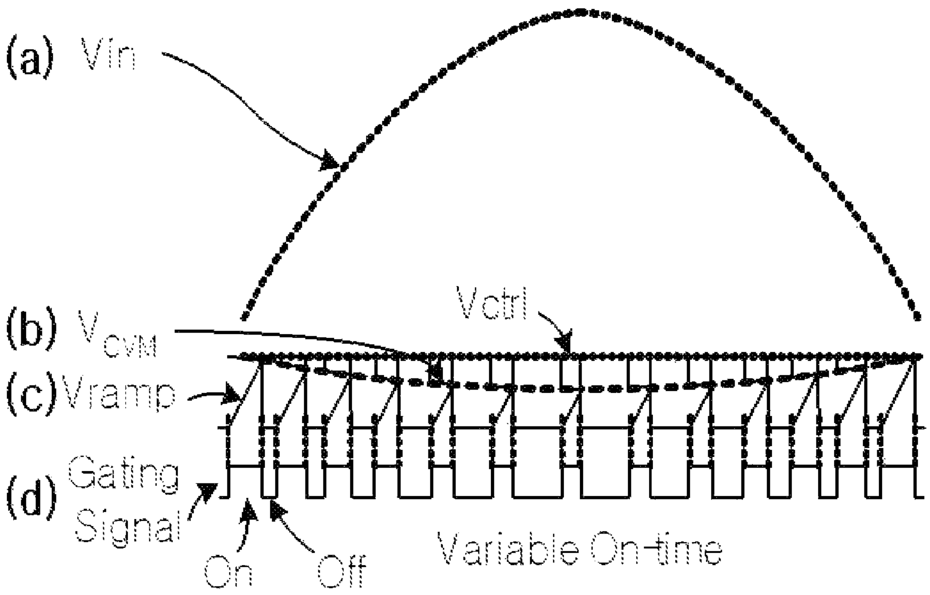
FIG. 14 is a waveform chart showing an input voltage, an output voltage of the control voltage modifier, a ramp voltage, and a gating signal inputted into a switch when output of the waveform generator is proportional to input voltage during the turn-on period of the switch in FIG. 8.

FIG. 14 shows waveforms in the case where output voltage $V_{WG}$ of the waveform generator is proportional to the input voltage when the switch is turned on as shown in FIG. 11. FIGS. 14(*a*), (*b*), (*c*), and (*d*) respectively show an input voltage Vin, an output voltage $V_{CVM}$ of the control voltage modifier 50, an output voltage Vramp of the ramp generator 40, and a gating signal inputted into the switch. As shown in FIG. 11(*c*), since output voltage $V_{WG}$ of the waveform generator is proportional to the input voltage Vin when the switch is turned on, the second control voltage $V_{CVM}$ outputted from the control voltage modifier 50 becomes a waveform shown in FIG. 14(*b*), and since the comparator CMP4 compares the second control voltage $V_{CVM}$ with the output voltage Vramp of the ramp generator 40, switch turn-on time of the gating signal changes depending on the input voltage.

That is, since the output voltage $V_{CVM}$ of the control voltage modifier 50 is lowered and meets the ramp voltage Vramp earlier as the input voltage Vin is higher, turn-on time of the switch is decreased as shown in FIG. 14(*d*). In addition, since the output voltage $V_{CVM}$ of the control voltage modifier 50 is increased and meets the ramp voltage Vramp later as the input voltage approaches zero, the turn-on time of the switch is extended as shown in FIG. 14(*d*). Therefore, it is understood that the turn-on period of the switch Qsw is changed depending on the magnitude of the input voltage Vin as shown in FIG. 14(*d*). That is, the turn-on period of the switch Qsw is long when the input voltage Vin is low, and the turn-on period of the switch Qsw is short when the input voltage Vin is high. Accordingly, when the input voltage Vin is low, the turn-on period of the switch Qsw is extended, and thus the current flowing through the inductor L1 is increased, and the input current Iin is increased. Therefore, distortion of input current occurring around zero input voltage (zero crossing distortion) can be reduced, and thus power factor is improved.

Figure 15:
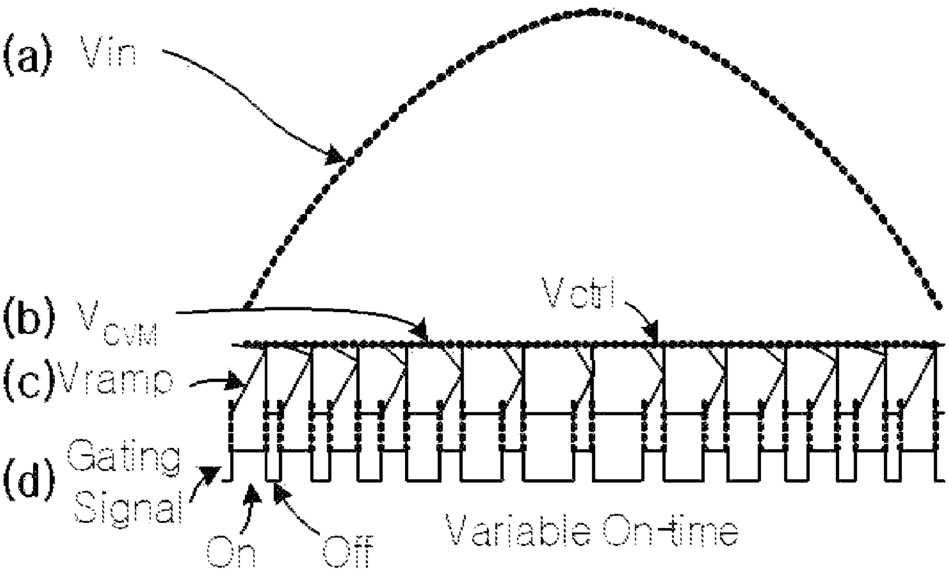
FIG. 15 is a waveform chart showing an input voltage, an output voltage of the control voltage modifier, a ramp voltage, and a gating signal inputted into a switch when output of the waveform generator is a ramp waveform having a slope that is proportional to input voltage in FIG. 8.

FIG. 15 shows waveforms in the case where output voltage $V_{WG}$ of the waveform generator is a ramp waveform having a slope proportional to input voltage when the switch is turned on as shown in FIG. 11. FIGS. 15(*a*), (*b*), (*c*), and (*d*) respectively show an input voltage Vin, a second control voltage $V_{CVM}$ outputted from the control voltage modifier 50, an output voltage Vramp of the ramp generator 40, and a gating signal inputted into the switch. As shown in FIG. 11(*d*), since output voltage $V_{WG}$ of the waveform generator 51 is a ramp waveform having a slope proportional to the input voltage, the second control voltage $V_{CVM}$ outputted from the control voltage modifier 50 becomes a waveform as shown in FIG. 15(*b*), and since the comparator CMP4 compares the second control voltage $V_{CVM}$ with the output voltage Vramp of the ramp generator 40, switch turn-on time of the gating signal changes depending on the input voltage.

That is, as shown in FIG. 15(*d*), since the second control voltage $V_{CVM}$ of the control voltage modifier 50 decreases at a steep slope and meets the ramp voltage Vramp as the input voltage is higher, turn-on time of the switch is decreased. In addition, since the output voltage $V_{CVM}$ of the control voltage modifier 50 decreases at a gentle slope and meets the ramp voltage Vramp as the input voltage approaches zero, the turn-on time of the switch is extended. Therefore, it is understood that the turn-on period of the switch Qsw is changed depending on the magnitude of the input voltage Vin as shown in FIG. 15(*d*). That is, the turn-on period of the switch Qsw is long when the input voltage Vin is low, and the turn-on period of the switch Qsw is short when the input voltage Vin is high. Accordingly, when the input voltage Vin is low, the turn-on period of the switch Qsw is extended, and thus the current flowing through the inductor L1 is increased, and the input current Iin is increased. Therefore, distortion of input current occurring around zero input voltage (zero crossing distortion) can be reduced, and thus power factor is improved.

Figure 16:
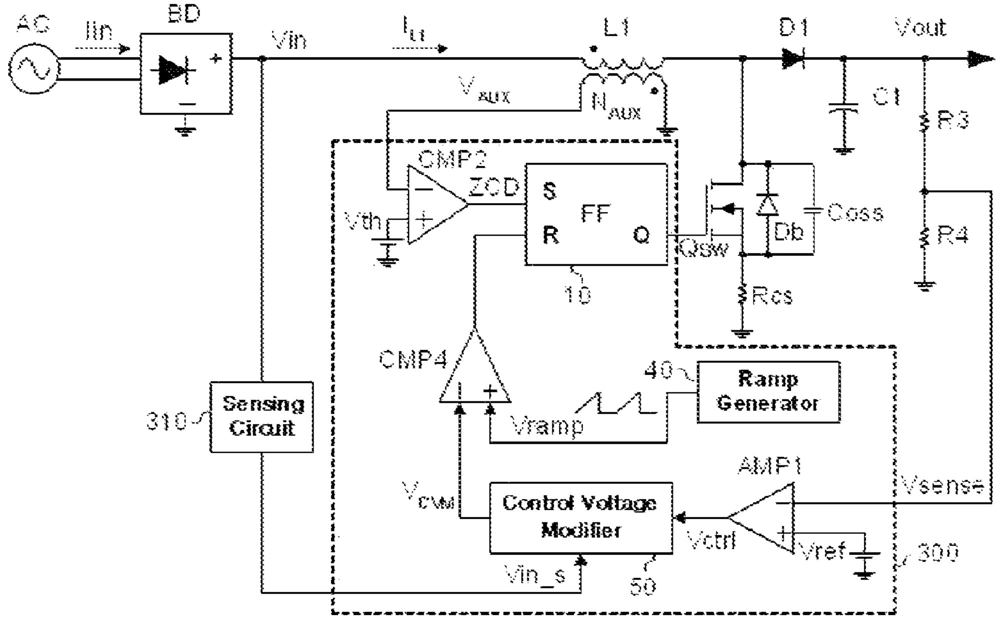
FIG. 16 is a waveform chart showing a variety of waveforms of the waveform generator of FIG. 15.

Then, the waveform of FIG. 11(*d*) may be increased linearly as shown in FIG. 16(*a*) or may be increased non-linearly as shown in FIGS. 16(*b*) and (*c*).

Figure 10:
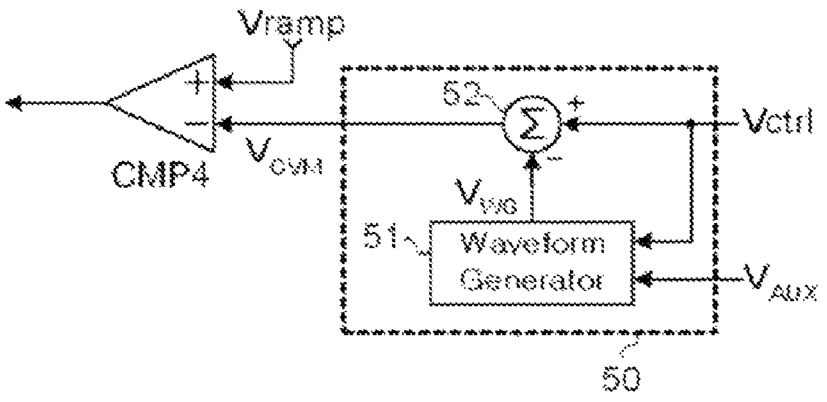
FIG. 10 is a view showing another embodiment of the control voltage modifier of FIG. 8.

On the other hand, in the internal configuration of the control voltage modifier 50 described above, although the input signal inputted into the waveform generator 51 may be only one, i.e., the second coil voltage $V_{AUX}$ as shown in FIG. 9, it is further preferable to configure the control voltage modifier to receive the first control voltage Vctrl of the output voltage controller AMP1 together with the second coil voltage $V_{AUX}$ as shown in the example of FIG. 10, in the aspect of preventing distortion of input current.

Describing this in further detail, as shown in FIG. 9, since output voltage $V_{WG}$ of the waveform generator 51 does not change depending on the load if the output voltage $V_{WG}$ is proportional only to the second coil voltage $V_{AUX}$, the switch turn-on time severely fluctuates and brings about distortion of input current depending on AC input voltage if the first control voltage Vctrl is considerably low. That is, switching turn-on time at the point of peak input voltage Vin is almost double the turn-on time at the point of becoming zero (zero crossing) if the first control voltage Vctrl is sufficiently high as shown in FIG. 11. However, when the first control voltage Vctrl is considerably low as shown in FIG. 13(*a*), difference between the switching turn-on times is increased more than 3 or 4 times, and thus distortion of input current can be occurred.

Figure 13:
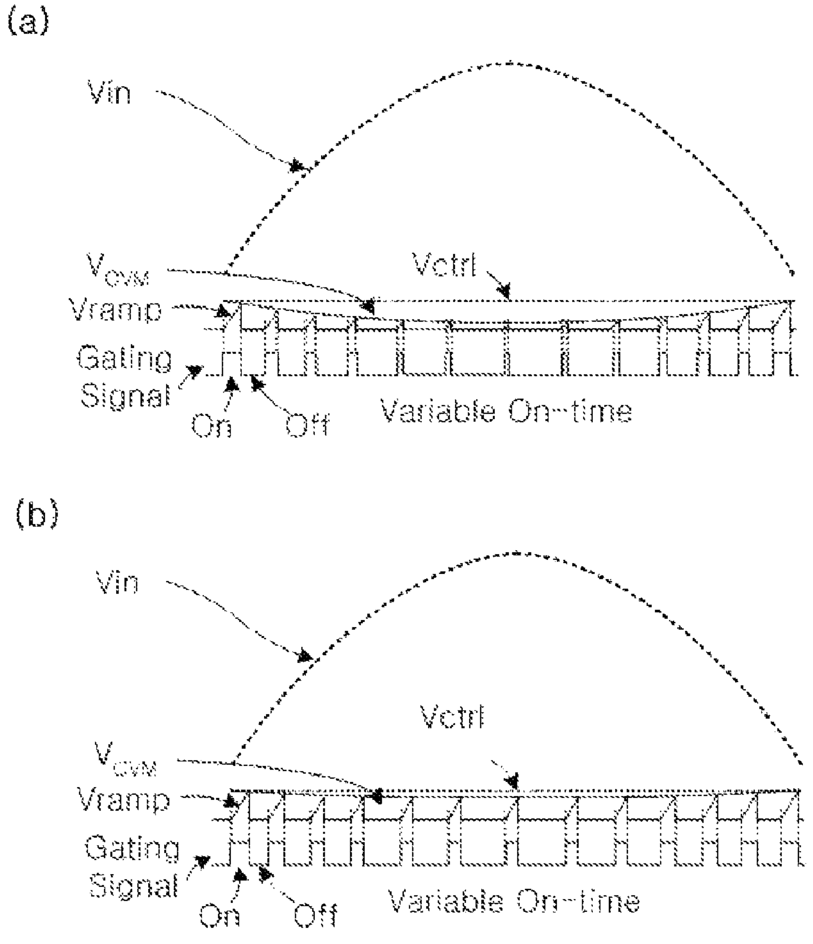
FIG. 13 is a waveform chart showing turn-on times according to the control voltage modifier shown in FIG. 9 and the control voltage modifier shown in FIG. 9*a* when a first control voltage is low.

However, if output voltage $V_{WG}$ of the waveform generator 51 is changed depending on the first control voltage Vctrl of the output voltage controller AMP1, as well as on the second coil voltage $V_{AUX}$, as shown in FIG. 10, the ratio between the switch turn-on times can be constantly maintained regardless of whether the first control voltage Vctrl is high or low as shown in FIG. 13(*b*), and thus it is advantageous in that distortion of input current that may occur when the first control voltage Vctrl is low can be prevented.

On the other hand, as can be understood from the explanation described above, when the second control voltage $V_{CVM}$ outputted from the control voltage modifier 50 determines the switch turn-on period, only the waveform of the switch turn-on period contributes to the determination of the turn-on period of the switch, and the waveform of the switch turn-off period of the second control voltage $V_{CVM}$ does not contribute to the determination of the turn-on period of the switch. Therefore, the waveform of the switch turn-off period of the second control voltage $V_{CVM}$ outputted from the control voltage modifier 50 may have an arbitrary waveform.

Hitherto, a method has been described which reduces distortion of input current, in which information on the input voltage Vin is not directly obtained, but through the second coil voltage $V_{AUX}$, and the first control voltage Vctrl of the output voltage controller AMP1 is adjusted depending on the input voltage in order to reduce the distortion of the input current. Hereinafter, another method of correcting distortion of input current will be described below, in which input voltage Vin is directly detected, and turn-on time of the switch Qsw is modified by adjusting the control voltage Vctrl of the output voltage controller AMP1 depending on the input voltage.

Figure 17:
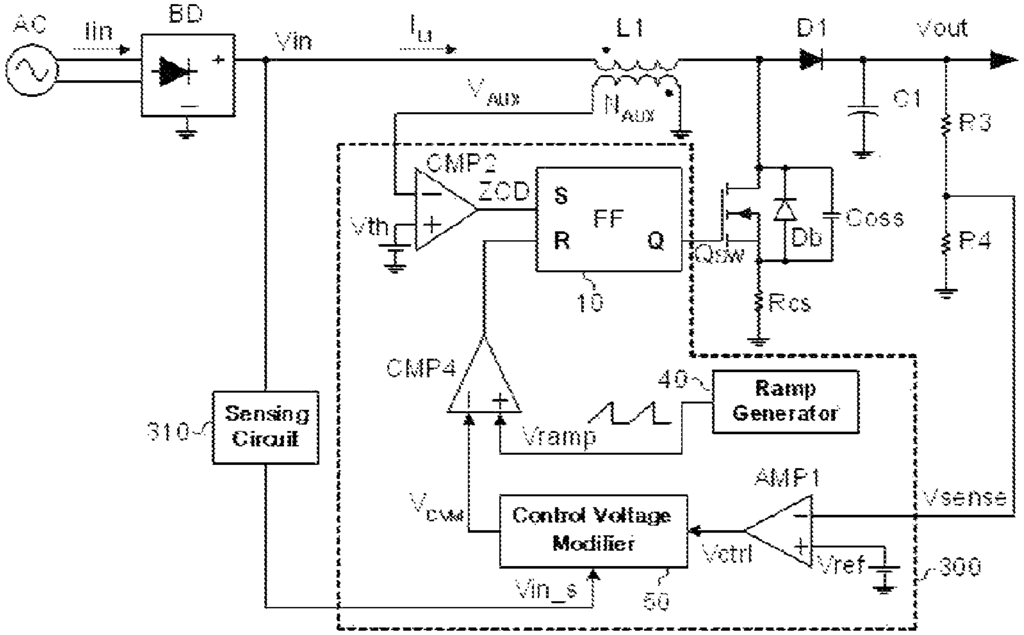
FIG. 17 is a circuit diagram showing a power factor correction circuit according to a second embodiment of the present invention.

FIG. 17 is a circuit diagram showing a power factor correction circuit according to a second embodiment of the present invention. As shown in FIG. 17, the power factor correction circuit according to the second embodiment of the present invention directly obtains information on the input voltage through an input voltage detection circuit 310 in order to adjust output voltage $V_{CVM}$ of the control voltage modifier 50 depending on the input voltage Vin. An input sensing voltage Vin_s detected and outputted by the input voltage detection circuit 310 is inputted into the control voltage modifier 50, and a second control voltage $V_{CVM}$ is generated and outputted as shown in FIGS. 12, 14 and 15 in the same manner as described in the first embodiment. Since the first and second embodiments are different only in the method of obtaining information on the input voltage Vin, in which the information is obtained from the second coil voltage $V_{AUX}$ (the first embodiment) or directly obtained by the input voltage detection circuit 310 (the second embodiment), and the other portions are the same, detailed description thereof will be omitted. That is, the operation method according to the input voltage is the same as shown in FIGS. 12, 14 and 15 of the first embodiment.

A method of adjusting the control voltage Vctrl of the output voltage controller AMP1 depending on information on input voltage Vin is described above. Hereinafter, another method of correcting distortion of input current will be described, in which turn-on time of the switch Qsw is modified by adjusting ramp voltage Vramp, i.e., a reference voltage, depending on information on the input voltage Vin.

Figure 18:
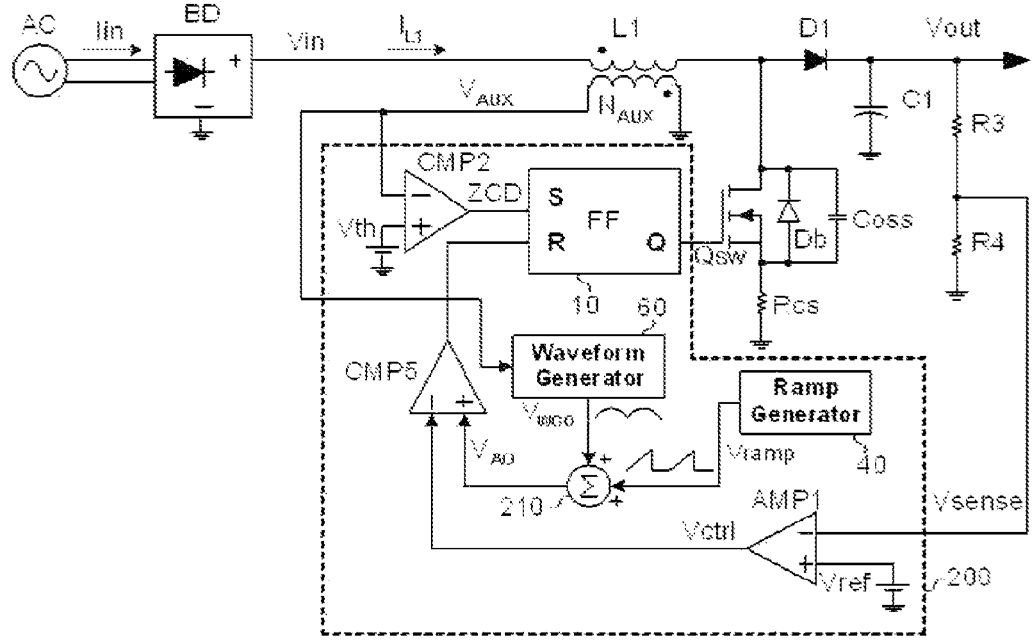
FIG. 18 is a circuit diagram showing a power factor correction circuit according to a third embodiment of the present invention.

As shown in FIG. 18, the power factor correction circuit according to the third embodiment of the present invention receives a second coil voltage $V_{AUX}$ from the waveform generator 60, obtains information on the input voltage Vin, generates a waveform corresponding to the input voltage Vin, and generates a turn-off reference voltage $V_{A0}$ by adding output voltage $V_{WG0}$ of the waveform generator 60 to output voltage Vramp of the ramp generator 40 through the adder 210. Since the output voltage $V_{WG0}$ of the waveform generator 60 increases as the input voltage Vin is increased, output voltage $V_{A0}$ of the adder 210 meets the first control voltage Vctrl of the output voltage controller AMP1 further earlier as the input voltage Vin increases, and thus switch turn-on time is shortened. Therefore, distortion of input current can be reduced by extending the turn-on time when the input voltage low and reducing the turn-on time when the input voltage high.

Figure 19:
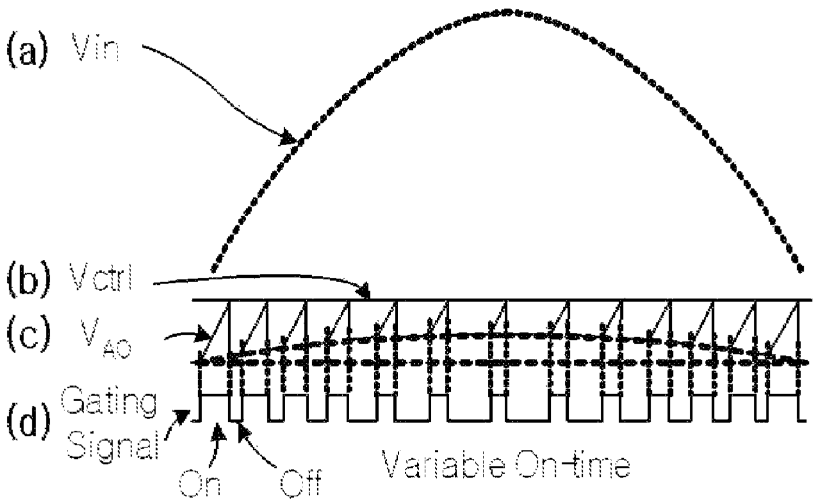
FIG. 19 is a waveform chart showing an input voltage, an output voltage of the output voltage controller, an output voltage of an adder, and a gating signal inputted into a switch when output of the waveform generator is proportional to input voltage in FIG. 18.

FIG. 19 shows waveforms in the case where output voltage $V_{WG0}$ of the waveform generator 60 is proportional to the input voltage as shown in FIG. 11 (*b*). FIGS. 19(*a*), (*b*), (*c*), and (*d*) respectively show an input voltage Vin, a first control voltage Vctrl of the output voltage controller AMP1, an output voltage $V_{A0}$ of the adder 210, and a gating signal inputted into the switch. As shown in FIG. 11(*b*), since output voltage $V_{WG0}$ of the waveform generator 60 is proportional to the input voltage Vin, a turn-off reference voltage $V_{A0}$ generated from adding the ramp voltage Vramp to the output voltage $V_{WG0}$ of the waveform generator 60 by the adder 210 becomes the waveform shown in FIG. 19(*b*), and since the turn-off reference voltage $V_{A0}$ is compared with the first control voltage Vctrl of the output voltage controller AMP1, switch turn-on time of the gating signal is changed depending on the input voltage.

That is, since the offset voltage is increased at the turn-off reference voltage $V_{A0}$ outputted from the adder 210 and the turn-off reference voltage $V_{A0}$ meets the control voltage Vctrl of the output voltage controller AMP1 earlier as the input voltage is higher, turn-on time of the switch is decreased as shown in FIG. 19(*d*). In addition, since the offset voltage is lowered at the turn-off reference voltage $V_{A0}$ and the turn-off reference voltage $V_{A0}$ meets the control voltage Vctrl of the output voltage controller AMP1 later as the input voltage approaches zero, the turn-on time of the switch is extended as shown in FIG. 19(*d*). Therefore, it is understood that the turn-on period of the switch Qsw is changed depending on the magnitude of the input voltage Vin as shown in FIG. 19(*d*). That is, the turn-on period of the switch Qsw is long when the input voltage Vin is low, and the turn-on period of the switch Qsw is short when the input voltage Vin is high. Accordingly, when the input voltage Vin is low, the turn-on period of the switch Qsw is extended, and thus the current flowing through the inductor L1 is increased, and the input current Iin is increased. Therefore, distortion of input current occurring around zero input voltage (zero crossing distortion) can be reduced, and thus power factor is improved.

Figure 20:
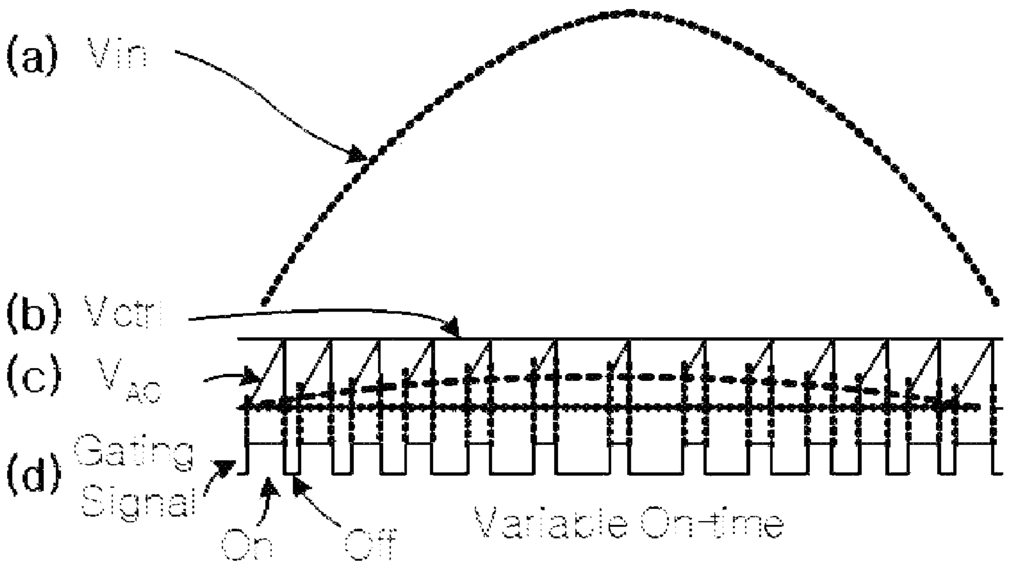
FIG. 20 is a waveform chart showing an input voltage, an output voltage of the output voltage controller, an output voltage of the adder, and a gating signal inputted into a switch when output of the waveform generator is proportional to input voltage during the turn-on period of the switch in FIG. 18.

FIG. 20 shows waveforms in the case where output voltage $V_{WG0}$ of the waveform generator 60 is proportional to input voltage when the switch is turned on as shown in FIG. 11 (*c*). FIGS. 20(*a*), (*b*), (*c*), and (*d*) respectively show an input voltage Vin, a control voltage Vctrl of the output voltage controller AMP1, a turn-off reference voltage $V_{A0}$ of the adder 210, and a gating signal inputted into the switch. As shown in FIG. 11(*c*), since output voltage $V_{WG0}$ of the waveform generator 60 is proportional to the input voltage Vin when the switch is turned on, the turn-off reference voltage $V_{A0}$ of the adder 210 generated by adding the ramp voltage Vramp to the output voltage $V_{WG0}$ of the waveform generator 60 becomes the waveform shown in FIG. 20(*c*), and since the turn-off reference voltage is compared with the control voltage Vctrl of the output voltage controller AMP1, switch turn-on time of the gating signal is changed depending on the input voltage. That is, since offset voltage is increased at the output voltage $V_{A0}$ of the adder 210 and the output voltage $V_{A0}$ of the adder 210 meets the control voltage Vctrl of the output voltage controller AMP1 earlier as the input voltage is higher, turn-on time of the switch is decreased as shown in FIG. 20(*d*). In addition, since the offset voltage is lowered at the output voltage $V_{A0}$ of the adder 210 and the turn-off reference voltage $V_{A0}$ meets the control voltage Vctrl of the output voltage controller AMP1 later as the input voltage approaches zero, the turn-on time of the switch is extended as shown in FIG. 20(*d*). Therefore, it is understood that the turn-on period of the switch Qsw is changed depending on the magnitude of the input voltage Vin as shown in FIG. 20(*d*). That is, the turn-on period of the switch Qsw is long when the input voltage Vin is low, and the turn-on period of the switch Qsw is short when the input voltage Vin is high. Accordingly, when the input voltage Vin is low, the turn-on period of the switch Qsw is extended, and thus the current flowing through the inductor L1 is increased, and the input current Iin is increased. Therefore, distortion of input current occurring around zero input voltage (zero crossing distortion) can be reduced, and thus power factor is improved.

Figure 21:
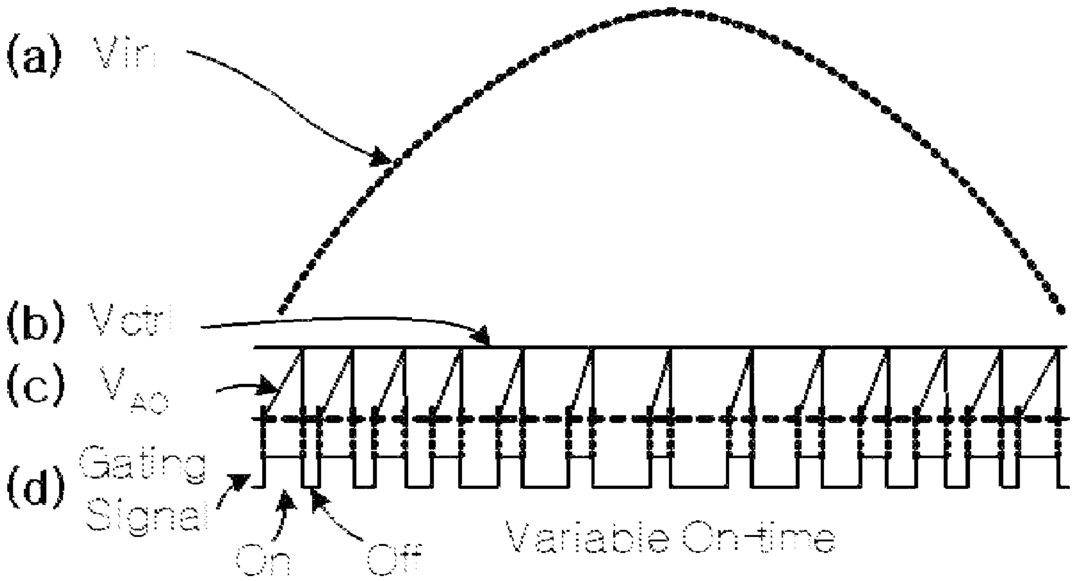
FIG. 21 is a waveform chart showing an input voltage, an output voltage of the output voltage controller, an output voltage of the adder, and a gating signal inputted into a switch when output of the waveform generator is a ramp waveform having a slope that is proportional to input voltage in FIG. 18.

FIG. 21 shows waveforms in the case where output voltage $V_{WG0}$ of the waveform generator 60 is a ramp waveform having a slope proportional to input voltage when the switch is turned on as shown in FIG. 11 (*d*). FIGS. 21(*a*), (*b*), (*c*), and (*d*) respectively show an input voltage Vin, a control voltage Vctrl of the output voltage controller AMP1, a turn-off reference voltage $V_{A0}$ of the adder 210, and a gating signal inputted into the switch. As shown in FIG. 11(*d*), since output voltage $V_{WG0}$ of the waveform generator 60 is a ramp waveform having a slope proportional to the input voltage Vin, the turn-off reference voltage $V_{A0}$ generated by adding the ramp voltage Vramp having a certain slope to the output voltage $V_{WG0}$ of the waveform generator 60 becomes the waveform shown in FIG. 21(*c*), and since the turn-off reference voltage $V_{A0}$ is compared with the first control voltage Vctrl of the output voltage controller AMP1, switch turn-on time of the gating signal is changed depending on the input voltage.

That is, since the slope of the output voltage $V_{A0}$ of the adder 210 is increased and the output voltage $V_{A0}$ of the adder 210 meets the control voltage Vctrl of the output voltage controller AMP1 earlier as the input voltage is higher, turn-on time of the switch is decreased as shown in FIG. 21(*d*). In addition, since the slope of the turn-off reference voltage $V_{A0}$ is decreased and the output voltage $V_{A0}$ of the adder 210 meets the control voltage Vctrl of the output voltage controller AMP1 later as the input voltage approaches zero, the turn-on time of the switch is extended as shown in FIG. 21(*d*). Therefore, it is understood that the turn-on period of the switch Qsw is changed depending on the magnitude of the input voltage Vin as shown in FIG. 21(*d*). That is, the turn-on period of the switch Qsw is long when the input voltage Vin is low, and the turn-on period of the switch Qsw is short when the input voltage Vin is high. Accordingly, when the input voltage Vin is low, the turn-on period of the switch Qsw is extended, and thus the current flowing through the inductor L1 is increased, and the input current Iin is increased. Therefore, distortion of input current occurring around zero input voltage (zero crossing distortion) can be reduced, and thus power factor is improved. As shown in FIG. 16, the output voltage $V_{WG0}$ of the waveform generator 60 may be increased linearly or non-linearly.

Figure 22:
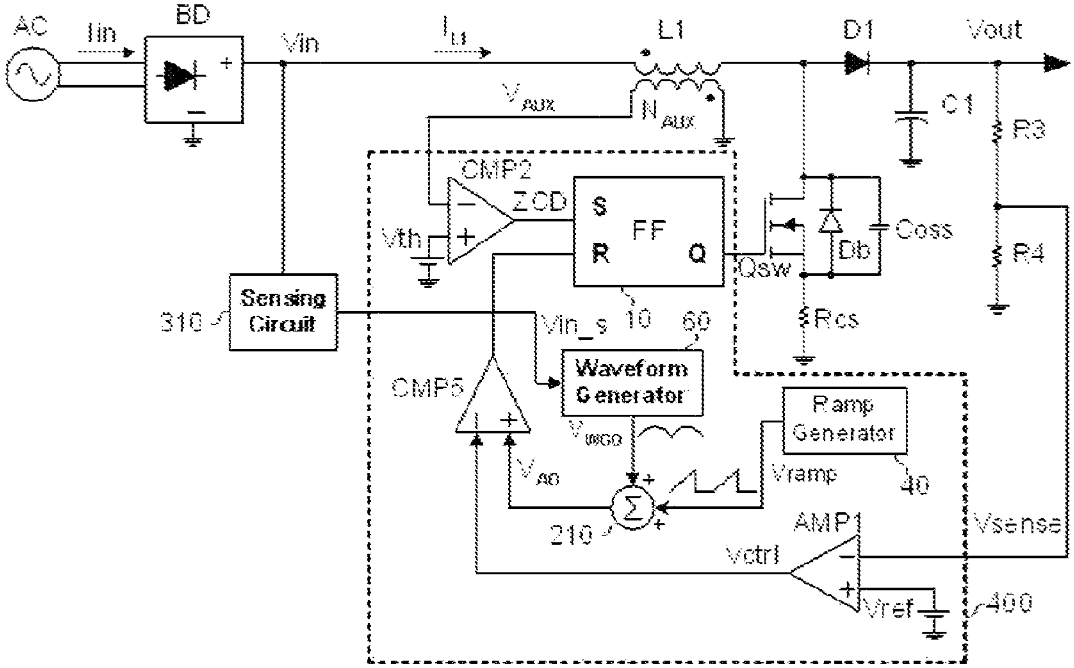
FIG. 22 is a view showing a power factor correction circuit according to a fourth embodiment of the present invention.

FIG. 22 is a view showing a power factor correction circuit according to a fourth embodiment of the present invention. As shown in FIG. 22, the power factor correction circuit according to the fourth embodiment directly obtains information on input voltage through the input voltage detection circuit 310 in order to adjust output voltage $V_{WG0}$ of the waveform generator 60 depending on the input voltage Vin, and modifies turn-on time of the switch Qsw by adjusting the ramp voltage Vramp depending on an input sensing voltage Vin_s obtained as such in order to correct distortion of input current.

The input sensing voltage Vin_s obtained from the input voltage detection circuit is inputted into the waveform generator 60, and a turn-off reference voltage $V_{A0}$ as shown in FIGS. 19, 20 and 21 is generated from the adder as described in the third embodiment. Since the third and fourth embodiments are different only in the method of obtaining information on the input voltage Vin, in which the information is obtained from the second coil voltage $V_{AUX}$ (the third embodiment) or directly obtained by the input voltage detection circuit 310 (the fourth embodiment), and the other portions are the same, detailed description thereof will be omitted. That is, the operation method according to the input voltage is the same as shown in FIGS. 19, 20, and 21 of the third embodiment.

INDUSTRIAL APPLICABILITY

The present invention can be applied to a power factor correction circuit for preventing a power loss invited by reactive power in a switching mode power supply. Particularly, in the case of power factor correction circuits used in the prior arts, there is a problem in that distortion occurs in an input current waveform as input voltage is increased, and thus power factor is degraded. However, the power factor correction circuit according to the present invention can effectively correct a distortion of input current and contribute to improving the power factor.

Although the present invention has been described with reference to several preferred embodiments, the description is illustrative of the invention and is not to be construed as limiting the invention. Various modifications and variations may occur to those skilled in the art, without departing from the scope of the invention as defined by the appended claims.

The invention claimed is:

1. A power factor correction circuit provided with a boost circuit including a first inductor which is electrically connected at a first end thereof to an input terminal and is electrically connected at a second end thereof to a switch, the power factor correction circuit comprising:

a second coil coupled with the first inductor for allowing a second coil voltage to be induced by the first inductor; and a switching control unit for receiving the second coil voltage and an output voltage of an output terminal of the power factor correction circuit, turning on the switch using the second coil voltage when current flowing through the first inductor becomes zero from positive, generating a second control voltage by adjusting a first control signal corresponding to the output voltage depending on the second coil voltage when the switch is turned on, and turning off the switch by comparing the second control voltage with a reference voltage, wherein the switching control unit comprises:

a first comparator for receiving the second coil voltage, comparing the second coil voltage with the reference voltage, and generating a switch turn-on signal when the second coil voltage becomes lower than the reference voltage;

an output voltage controller for receiving the output voltage of the output terminal and outputting a first control voltage for controlling the turning off of the switch;

a control voltage modifier for receiving the second coil voltage and the first control voltage of the output voltage controller and outputting the second control voltage whose waveform is modified using the second coil voltage;

a ramp generator for generating a ramp waveform voltage; and a second comparator for comparing the second control voltage of the control voltage modifier with the ramp waveform voltage, and generating a switch turn-off signal when the ramp waveform voltage becomes equal to the second control voltage.

2. The circuit according to claim 1, wherein the control voltage modifier comprises:

a waveform generator for receiving the second coil voltage and generating a waveform voltage changing depending on the second coil voltage; and an adder for receiving the first control voltage of the output voltage controller and the waveform voltage of the waveform generator and outputting a signal generated by subtracting the waveform voltage from the first control voltage as the second control voltage.

3. The circuit according to claim 2, wherein the waveform generator further receives the first control voltage of the output voltage controller and generates the waveform voltage changing depending on the second coil voltage and the first control voltage.

4. A power factor correction circuit provided with a boost circuit including a first inductor which is electrically connected at a first end thereof to an input terminal and is electrically connected at a second end thereof to a switch, the power factor correction circuit comprising:

a second coil coupled with the first inductor for allowing a second coil voltage to be induced by the first inductor; and a switching control unit for receiving an input sensing voltage obtained by detecting an input voltage of the input terminal, the second coil voltage, and an output voltage of an output terminal of the power factor correction circuit, turning on the switch using the second coil voltage when current flowing through the first inductor becomes zero from positive, generating a second control voltage by adjusting a first control signal corresponding to the output voltage depending on the input sensing voltage when the switch is turned on, and turning off the switch by comparing the second control voltage with a reference voltage, wherein the switching control unit comprises:

a first comparator for receiving the second coil voltage, comparing the second coil voltage with the reference voltage, and generating a switch turn-on signal when the second coil voltage becomes lower than the reference voltage;

an output voltage controller for receiving the output voltage of the output terminal and outputting a first control voltage for controlling the turning off of the switch;

a control voltage modifier for receiving the input sensing voltage of the input terminal and the first control voltage of the output voltage controller and outputting the second control voltage whose waveform is modified using the second coil voltage;

a ramp generator for generating a ramp waveform voltage; and a second comparator for comparing the second control voltage of the control voltage modifier with the ramp waveform voltage, and generating a switch turn-off signal when the ramp waveform voltage becomes equal to the second control voltage.

5. The circuit according to claim 4, wherein the control voltage modifier comprises:

a waveform generator for receiving the input sensing voltage and generating a waveform voltage changing depending on the input sensing voltage; and an adder for receiving the first control voltage of the output voltage controller and the waveform voltage of the waveform generator and outputting a signal generated by subtracting the waveform voltage from the first control voltage as the second control voltage.

6. The circuit according to claim 5, wherein the waveform generator further receives the first control voltage of the output voltage controller and generates the waveform voltage changing depending on the input sensing voltage and the first control voltage.

7. A power factor correction circuit provided with a boost circuit including a first inductor which is electrically connected at a first end thereof to an input terminal and is electrically connected at a second end thereof to a switch, the power factor correction circuit comprising:

a second coil coupled with the first inductor for allowing a second coil voltage to be induced by the first inductor; and a switching control unit for receiving the second coil voltage and an output voltage of an output terminal of the power factor correction circuit, turning on the switch using the second coil voltage when current flowing through the first inductor becomes zero from positive, generating a turn-off reference voltage by combining a waveform voltage corresponding to the second coil voltage with a reference voltage when the switch is turned on, and controlling the turn-off of the switch by comparing the turn-off reference voltage with the first control voltage corresponding to the output voltage, wherein the switching control unit comprises:

a first comparator for receiving the second coil voltage, comparing the second coil voltage with the reference voltage, and generating a switch turn-on signal when the second coil voltage becomes lower than the reference voltage;

an output voltage controller for receiving the output voltage of the output terminal and outputting a first control voltage for controlling the turning off of the switch;

a waveform generator for receiving the second coil voltage and generating a waveform voltage changing depending on the second coil voltage;

a ramp generator for generating a ramp waveform voltage as a reference voltage;

an adder for generating a turn-off reference voltage by combining the waveform voltage of the waveform generator with the ramp waveform voltage of the ramp generator; and a second comparator for comparing the first control voltage with the turn-off reference voltage, and generating a switch turn-off signal when the first control voltage becomes equal to the turn-off reference voltage.

8. The circuit according to claim 7, wherein the waveform generator further receives the first control voltage of the output voltage controller and generates the waveform voltage changing depending on the second coil voltage and the first control voltage.

9. A power factor correction circuit provided with a boost circuit including a first inductor which is electrically connected at a first end thereof to an input terminal and is electrically connected at a second end thereof to a switch, the power factor correction circuit comprising:

a second coil coupled with the first inductor for allowing a second coil voltage to be induced by the first inductor; and a switching control unit for receiving an input sensing voltage obtained by detecting an input voltage of the input terminal, the second coil voltage, and an output voltage of an output terminal of the power factor correction circuit, turning on the switch using the second coil voltage when current flowing through the first inductor becomes zero from positive, generating a turn-off reference voltage by combining a waveform voltage corresponding to the input sensing voltage with a reference voltage when the switch is turned on, and controlling the turn-off of the switch by comparing the turn-off reference voltage with the first control voltage corresponding to the output voltage.

10. The circuit according to claim 9, wherein the switching control unit comprises:

a first comparator for receiving the second coil voltage, comparing the second coil voltage with the reference voltage, and generating a switch turn-on signal when the second coil voltage becomes lower than the reference voltage;

an output voltage controller for receiving the output voltage of the output terminal and outputting a first control voltage for controlling the turning off of the switch;

a waveform generator for receiving the input sensing voltage and generating a waveform voltage changing depending on the input sensing voltage;

a ramp generator for generating a ramp waveform voltage as a reference voltage;

an adder for generating a turn-off reference voltage by combining the waveform voltage of the waveform generator with the ramp waveform voltage of the ramp generator; and a second comparator for comparing the first control voltage with the turn-off reference voltage, and generating a switch turn-off signal when the first control voltage becomes equal to the turn-off reference voltage.

11. The circuit according to claim 10, wherein the waveform generator further receives the first control voltage of the output voltage controller and generates the waveform voltage changing depending on the input sensing voltage and the first control voltage.

12. The circuit according to claim 2, wherein the waveform generated from the waveform generator is a waveform proportional to the input voltage.

13. The circuit according to claim 2, wherein the waveform generated from the waveform generator is a waveform proportional to the input voltage during a turn-on period of the switch.

14. The circuit according to claim 2, wherein the waveform generated from the waveform generator is a ramp waveform having a slope proportional to the input voltage during a turn-on period of the switch.

15. The circuit according to claim 5, wherein the waveform generated from the waveform generator is a waveform proportional to the input voltage.

16. The circuit according to claim 5, wherein the waveform generated from the waveform generator is a waveform proportional to the input voltage during a turn-on period of the switch.

17. The circuit according to claim 5, wherein the waveform generated from the waveform generator is a ramp waveform having a slope proportional to the input voltage during a turn-on period of the switch.

18. The circuit according to claim 7, wherein the waveform generated from the waveform generator is a waveform proportional to the input voltage.

19. The circuit according to claim 7, wherein the waveform generated from the waveform generator is a waveform proportional to the input voltage during a turn-on period of the switch.

20. The circuit according to claim 7, wherein the waveform generated from the waveform generator is a ramp waveform having a slope proportional to the input voltage during a turn-on period of the switch.

21. The circuit according to claim 10, wherein the waveform generated from the waveform generator is a waveform proportional to the input voltage.

22. The circuit according to claim 10, wherein the waveform generated from the waveform generator is a waveform proportional to the input voltage during a turn-on period of the switch.

23. The circuit according to claim 10, wherein the waveform generated from the waveform generator is a ramp waveform having a slope proportional to the input voltage during a turn-on period of the switch.

* * * * *